United States Patent [19]

Hart et al.

[11] Patent Number: 5,545,319

[45] Date of Patent: Aug. 13, 1996

[54] SIEVE SYSTEM FOR AN ION EXCHANGE COLUMN

[75] Inventors: Robert G. Hart, Bay Village, Ohio; Bashir M. Ahmed, Utica; Carlos Gonzales, Troy, both of Mich.; William G. Kozak, Hatfield, Pa.

[73] Assignee: Henkel Corporation, Plymouth Meeting, Pa.

[21] Appl. No.: 302,156

[22] Filed: Sep. 8, 1994

[51] Int. Cl.⁶ ............................................. B01D 24/10
[52] U.S. Cl. ..................... 210/279; 210/289; 210/291; 210/285
[58] Field of Search ............................ 210/279, 289, 210/291, 276, 280, 285, 460

[56] References Cited

U.S. PATENT DOCUMENTS

| | | | |
|---|---|---|---|
| 171,056 | 12/1875 | Sinclaire | 210/285 |
| 2,725,144 | 11/1955 | Smith et al. | 210/460 |
| 2,785,109 | 3/1957 | Schwalge | 210/285 |
| 3,174,623 | 3/1965 | Sloan | 210/285 |
| 3,220,552 | 11/1965 | Staats | 210/96 |
| 3,263,813 | 8/1966 | Keller | 210/279 |
| 3,581,894 | 6/1971 | Minart | 210/96 |
| 3,685,657 | 8/1972 | Hunter et al. | 210/289 |
| 4,094,790 | 6/1978 | Schmidt, Jr. | 210/289 |
| 4,452,705 | 6/1984 | Herrmann | 210/286 |
| 4,460,467 | 7/1984 | Ueda | 210/279 |
| 4,773,998 | 9/1988 | Heinrich | 210/288 |
| 5,089,108 | 2/1992 | Small | 210/460 |

*Primary Examiner*—Cynthia L. Nessler
*Attorney, Agent, or Firm*—Ernest G. Szoke; Wayne C. Jaeschke; Kenneth Watov

[57] ABSTRACT

Apparatus for use in an ion exchange unit or column comprising a riser pipe, a port coupled to one end of said pipe, a first rigid cylinder having apertures therein mounted concentrically on the pipe, a port coupled to the space between the pipe and said cylinder, a mesh sleeve concentrically mounted about the cylinder, a sieve mounted about the mesh sleeve, a second rigid cylinder concentric with the pipe and near its outer end, a second mesh sleeve mounted about said second rigid cylinder and a sieve bag containing the second mesh sleeve. The aperture size in said sieve material is only sufficiently fine to prevent the passage of ion exchange resin beads.

9 Claims, 10 Drawing Sheets

SIEVE SYSTEM FOR AN ION EXCHANGE COLUMN

RELATED INVENTIONS

The invention of the present patent application is related to the commonly assigned invention of co-pending application Ser. No. 08/008,956 filed on Jan. 26, 1993 for "Apparatus for Maintaining A Stable Bath For An Autodeposition Composition By Periodically Separating Particular Metal Ions From The Composition". The teachings of this co-pending application are incorporated into the present application in their entirety by reference, provided any of such teachings are not inconsistent with any teaching herein.

FIELD OF INVENTION

The field of the present invention relates generally to the reconditioning of chemical baths in which metal ions build up over a period of time, and more particularly to reconditioning baths used in systems for coating metals with paint via a chemical reaction. In such systems an autodeposition composition bath is periodically stabilized or reconditioned by removing therefrom paint particles and dissolved and/or dispersed multivalent metal ions accumulated over a period of operation.

BACKGROUND OF THE INVENTION

In an apparatus for depositing paint on metal articles by an autodeposition process, positively charged metal ions gradually migrate from articles into the dispersion of negatively charged latex resin and pigment particles so as to eventually render the dispersion ineffective for paint deposition. Instead of discarding this contaminated dispersion, it is reconditioned by passing it through a column of ion exchange resin beads in an ion exchange process that removes the metallic ions from the dispersion. After reconditioning, the paint dispersion can be reused. The ion exchange column is provided with screens that allow the paint dispersion to pass while preventing release of ion exchange resin beads into the autodeposition coating working bath. Unfortunately, however, conventionally used screens soon become clogged by a compacted aggregation of ion exchange resin beads, dispersed latex particles, and dispersed pigment particles.

The screening apparatus is constructed so that the paint dispersion passes via a first screen into a bed of ion exchange resin beads and then via a second screen to a riser pipe from which the reconditioned painting dispersion flows. The aggregated beads-latex-pigment are primarily deposited on the input side of the second screen. During backflushing, conducted to remove the latex and pigment dispersion from the bed of ion exchange beads, aggregated beads-latex-pigment are primarily deposited on the input side (input for backflush flow) of the first screen.

A significant disadvantage of the screening system just described is that, even with reversing flow direction across the screens, within a short time it becomes necessary to disassemble the ion exchange column and thoroughly clean the compacted aggregate from the screens. This requires a great deal of time during which the ion exchange column is out of service.

SUMMARY OF THE INVENTION

In accordance with this invention, the first and second screens are effectively replaced by specially constructed, flexible, mesh particle sieves comprised of a rigid cylinder having apertures therein that are mounted coaxially about the riser pipe referred to, a coarse mesh of wire or plastic outside of the rigid cylinder and flexible finer sieve screen material outside of the mesh. The size of the apertures in this outer sieve material is only fine enough to prevent the passage of the ion exchange resin beads (for example, U.S. Standard Sieve Size No. 70). During reversals in the flow of fluid through the ion exchange column, the flexible mesh is deformed by the hydraulic forces. This deformation is effective in dislodging the aforementioned compacted ion exchange bead-latex-pigment aggregate, thereby providing for much longer operation before it becomes necessary to disassemble the ion exchange column for screen cleaning.

The ion exchange resin bed acts somewhat like a sand filter in that a shallow compacted cake of latex and pigment forms on the top of the ion exchange bed during the forward (i.e. downward) flow of the dispersion through the bed. During backflow, the cake may be rigid enough to maintain the ion exchange bed as a solid unit and lift it (so-called "pistoning") to the top of the column thereby blinding the exit resin screen and preventing effective flow of fluid through the ion exchange column. In accordance with another aspect of this invention, this action is prevented by rigid protrusions extending radially from the riser pipe into the resin bed. The protrusions are constructed to resist bending in a vertical direction. When pistoning of the resin bed occurs, the protrusions cause fissures in the rigid cake that facilitate fluidization of the beads and prevent the lifting of the resin bead bed as a single unit.

DETAILED DISCUSSION OF THE INVENTION

Figure 1:
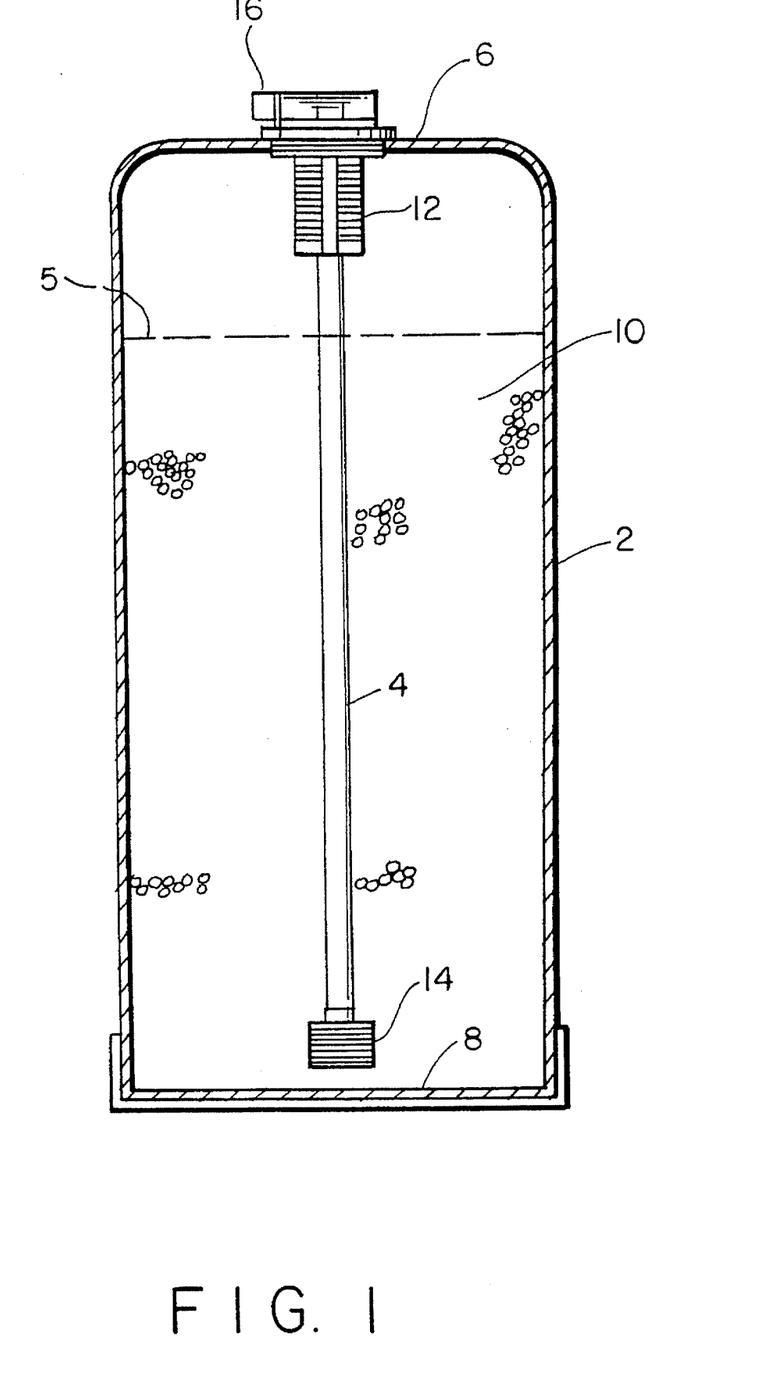
FIG. 1, shows the basic components of an ion exchange column.

FIG. 1 illustrates the general configuration of an ion exchange column. It is comprised of a vessel 2 having a riser pipe 4 extending from its top 6 to point near its bottom 8. Resin 10 in the form of 20–50 mesh beads fills the space between the riser pipe 4 and the vessel 2 up to a level 5. Distributor screens 12 and 14 that are concentric with the pipe 4 are located at its top and bottom, respectively. Fluid to be reconditioned can be introduced in an upflow or downflow manner. In this example, the fluid is introduced via a port 16 into the annular space between the top of the riser pipe 4 and the distributor screen 12 and flows downwardly through the resin 10. It then flows into the bottom of the riser pipe 4 via the distributor screen 14, through the riser pipe 4 and out of a port, not shown, at its top.

Figure 2A:
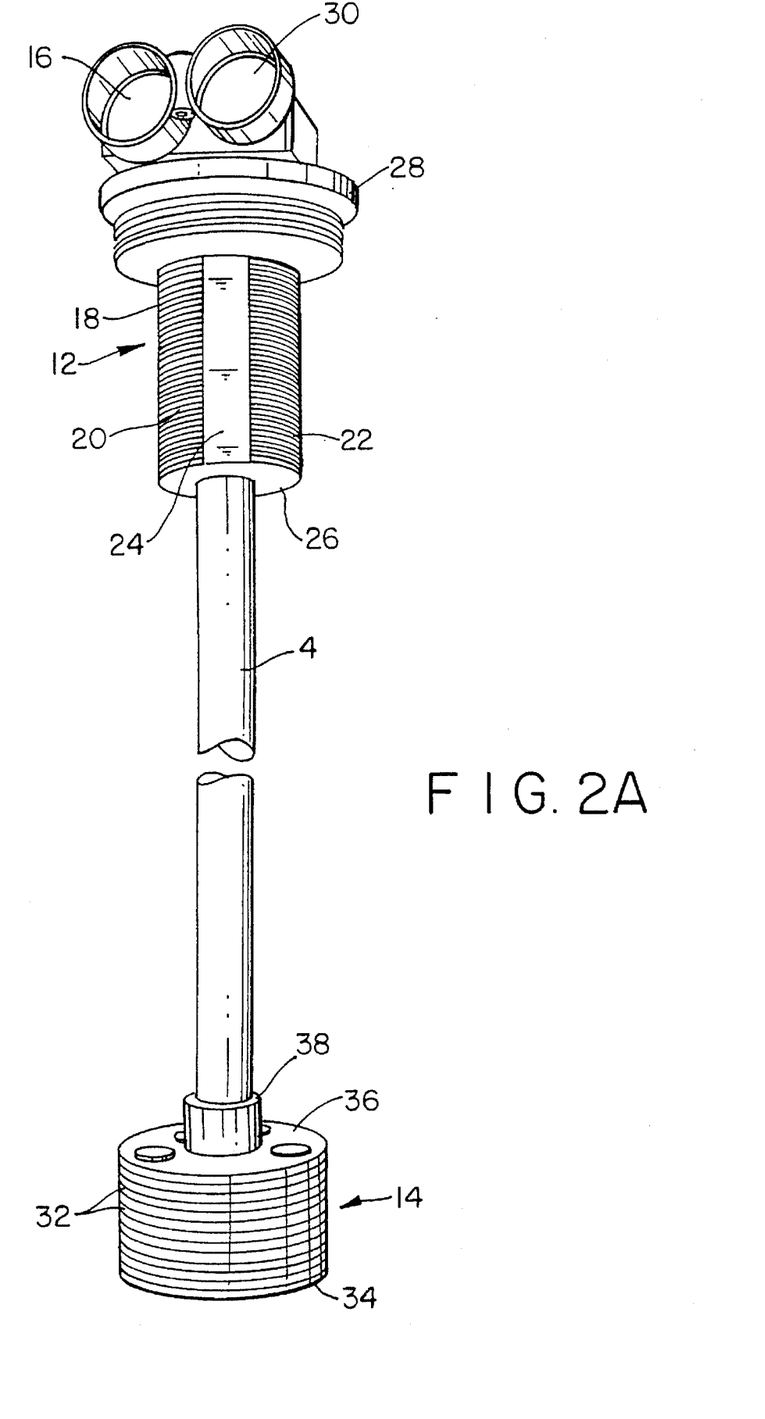
FIG. 2A, is an enlarged view of the screening components shown in FIG. 1.

FIG. 2A shows the distributor screen just generally described in greater detail. The upper distributor screen 12 is comprised of a hollow cylinder 18 that is concentric with the riser pipe 4 so as to form an annular space between them. Four spaced columns of horizontal slits such as 20 and 22 are formed in the side of the cylinder 18 so as to prevent the passage of ion exchange resin beads. They are respectively separated by vertical ribs such as shown at 24. The bottom 26 of the annular space between the cylinder 18 and the riser pipe 4 is filled in so that fluid introduced into the port 16 flows into the annular space referred to and out through the columns of slits such as 20 and 22.

The bottom distributor screen 14 is comprised of a stack of annular discs 32 that are separated from each other by means of little nubs (not shown). The bottom disc 32 is not annular but is a complete disc so that fluid entering the spaces between the annular discs 34 must flow upward. The top disc 36 is provided with an annular flange 38 that is fastened to the bottom of the riser pipe 4.

The distributor screens 12 and 14 are attached to the vessel 2 by an externally threaded annular nut 28 that is attached to the top of the annular cylinder 18. The port 16, as is shown in FIG. 2C, communicates with the annular-space between the cylinder 18 and the riser pipe 4, and a port 30 communicates with the upper end of the riser pipe 4.

Figure 2B:
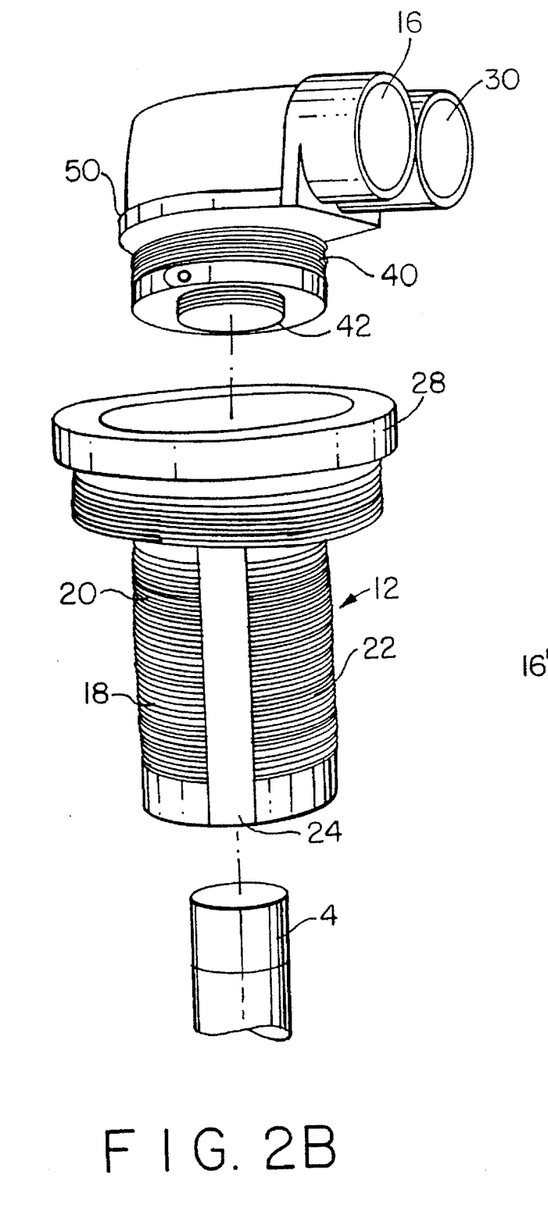
FIG. 2B, shows of certain parts of the ports in conveying liquid to and from the screening components.
Figure 2C:
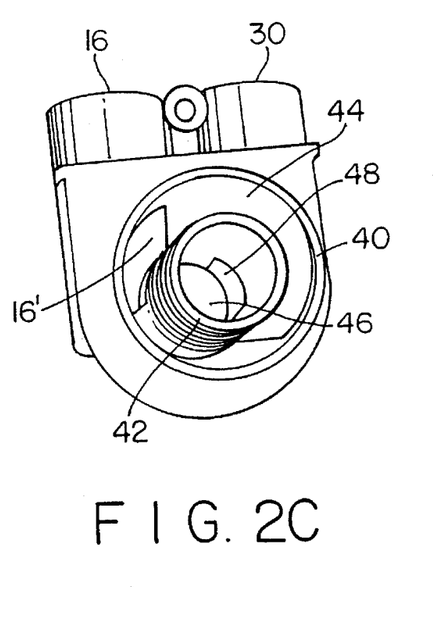
FIG. 2C, is a different view of parts shown in FIG. 2B.

FIG. 2B shows how the ports 16 and 30 are coupled to the annular nut 28. As will be explained in connection with FIG. 2C, the port 16 communicates with an annular nut 40 that is threaded into the annular nut 28, and the port 30 communicates with a nipple 42 that includes two internal O-rings (not shown) for retaining therein an end portion of riser pipe 4, in this example. FIG. 2C is a view looking up into the port structure just described. The annular space between the nipple 42 and the annular nut 40 is closed off by an outside wall 44 except for an opening 16' that communicates with the port 16. The top of the nipple 42 is closed off by an inner wall 46 except for an opening 48 that communicates with the port 30. A plate 50 bears against the top of the annular nut 28, with an O-ring seal (not shown) therebetween, when the nut 40 is threaded into it. Note that plate 50, ports 16 and 30, nipple 42, and nut 40 collectively form a manifold, for example.

Figure 3:
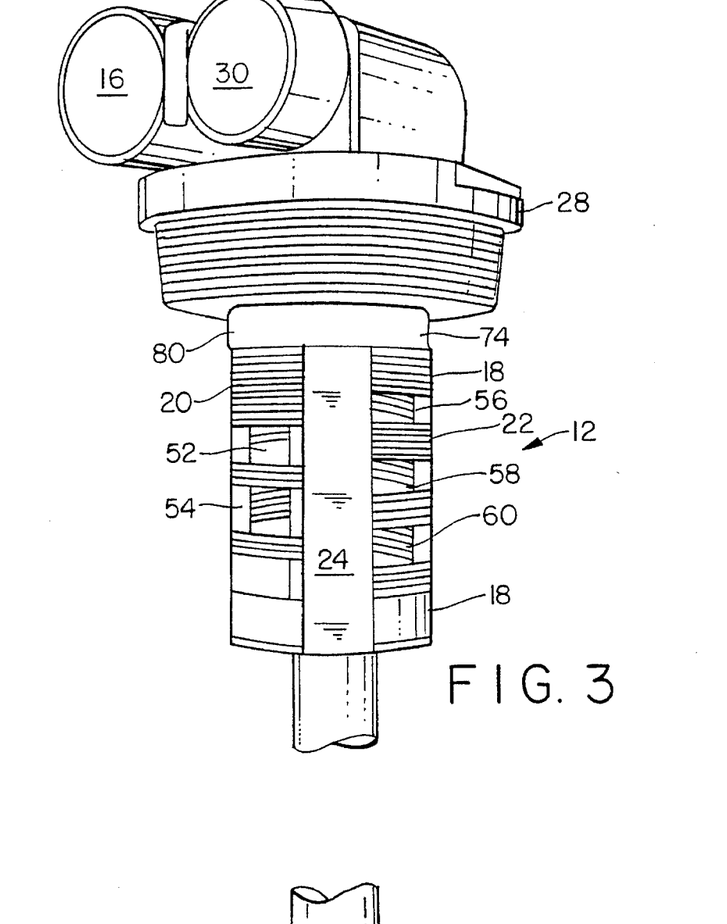
FIG. 3, shows a modification of an upper distributor screen of the prior art that can be made accommodate the present invention.
Figure 4:
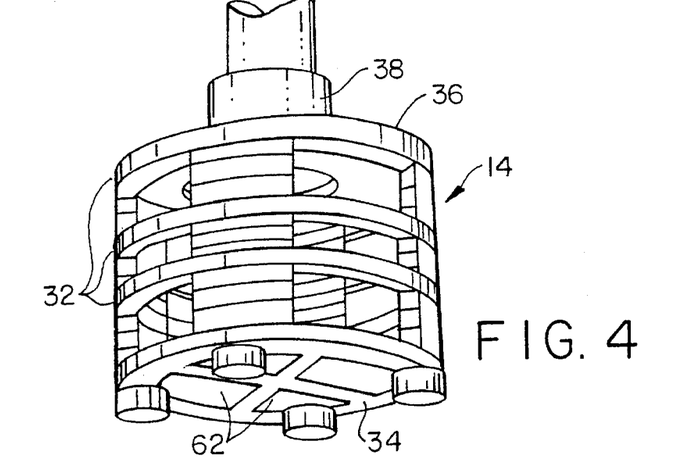
FIG. 4, shows a modification of a lower distributor screen of the prior art that can be made to accommodate the present invention.

FIG. 3 illustrates the modifications made on the distributor screens 12 and 14 when they are adapted to be used with this invention. The screening ability of the upper distributor screen 12 and of the lower distributor screen 14 is destroyed by eliminating some of the material from which the slits such as 20 and 22 are formed, thereby, in effect, forming large slots such as 52, 54, 56, 58, and 60. Very little fluid will flow through the small slits such as 20 and 22. The screening ability of the lower distributor screen 14 is destroyed by removing some of the annular discs 32 and by forming openings 62 in the bottom disc 34. This modification of the distributor screens 12 and 14 does not destroy their overall structural form, however, so that they may serve as means for supporting or mounting components of the present invention.

The invention will now be described in the form it will take when used in conjunction with the known screening structure modified as just explained.

Figure 5A:
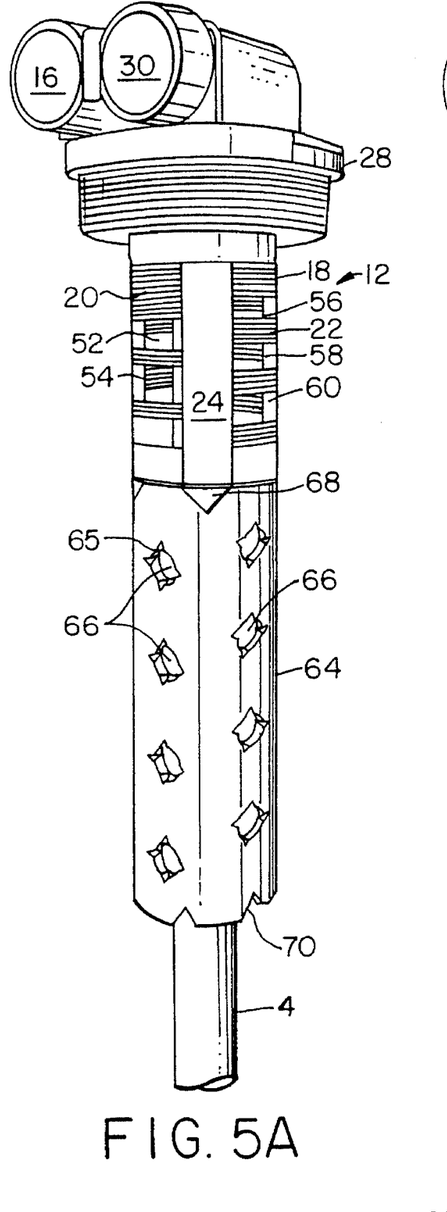
FIG. 5A, shows an upper rigid cylinder and the upper modified distributor screen.
Figure 5B:
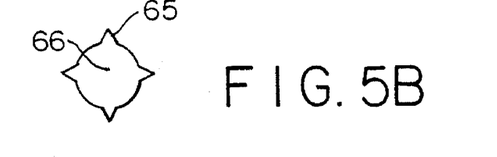
FIG. 5B, shows slots in the edge of an aperture in the rigid cylinder of FIG. 5A.

In FIG. 5A, an upper rigid cylinder 64 having apertures 66 therein is placed in coaxial relationship with the riser pipe 4 and is axially aligned with the modified screen cylinder 18, but there is nothing to retain it in this position. In this particular embodiment, the outer diameter of the cylinder 64 is the same as the diameter of the screen cylinder 18 so that it bears axially against it as shown when pushed in an upward direction. Apertures 66 are formed through the wall of the cylinder, and slots 68 are formed in its edges. An enlarged view of an aperture 66 and of slots 65 is shown in FIG. 5B. The slots 65 are formed, in this example, 90° apart and extend from the outside edge of the associated aperture 66 inward along the interior wall of the aperture 66. The slots can be triangular, rectangular or some other shape so as to prevent sieve material 84 from obstructing the flow of fluid into the aperture 66. For reasons to be explained, notches 68 are formed in the upper end of the rigid cylinder 64 and notches 70 are formed in its bottom end.

Figure 6:
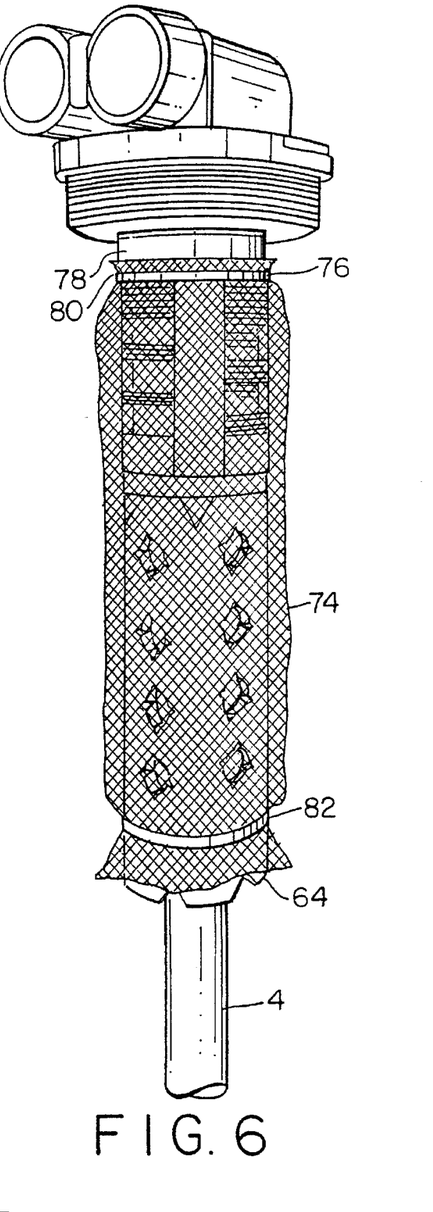
FIG. 6, shows a mesh sleeve over a modified distributor screen and the upper rigid cylinder.

FIG. 6 is the same as FIG. 5 except that a flexible mesh sleeve 74 is mounted coaxially with and over the rigid cylinder 64. The mesh sleeve 74 extends upwardly so as to cover the annular cylinder 18. The mesh 74 may be comprised of wire or plastic having large openings that provide no screening action. Several layers of mesh may be used. A removable band 76 firmly binds the top of the mesh sleeve 74 to an annular protrusion 78 from the bottom of the nut 28. The protrusion 78 has a groove 80 of reduced diameter that makes it easier for a band 76 to firmly bind the upper end of the mesh sleeve 74 to the protrusion 78. A band 82 is wrapped about the mesh sleeve 74 so as to hold it in contact with the lower end of the rigid cylinder 64.

Figure 7:
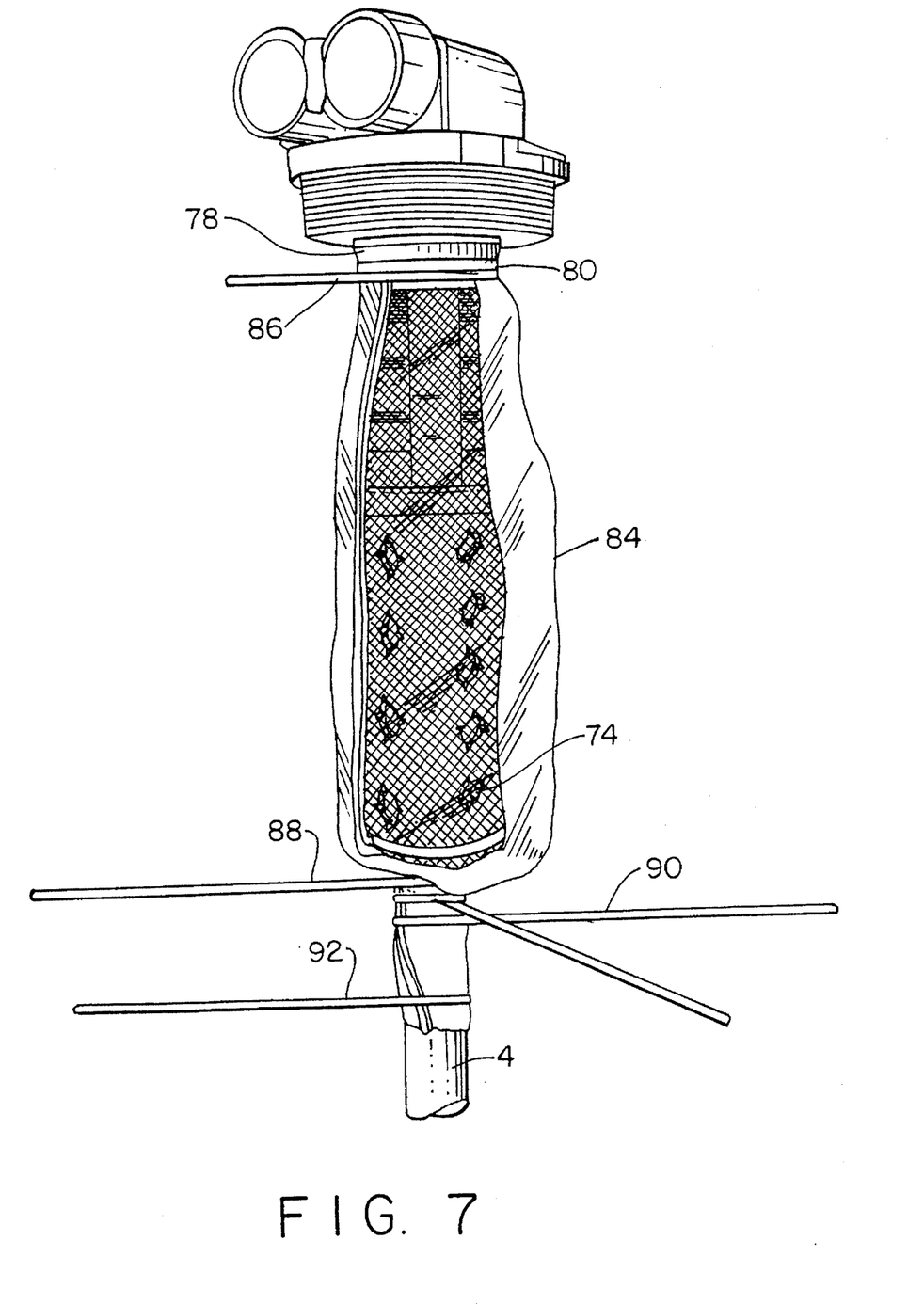
FIG. 7, shows a sieve screen over the mesh sleeve and for the upper rigid cylinder and modified distributor screen.

Finally, as shown in FIG. 7, a sieve sleeve 84 is placed over the mesh sleeve 74 and secured in the groove 80 by a band 86. The lower end of the sieve sleeve 84 is bound to the riser pipe 4 at a point spaced from the rigid cylinder 64 by bands 88, 90, and 92 that resist flexing vertically but bend more easily in a horizontal direction. Plastic cable ties such as TYRAPS® serve the purpose. Note that other securement means than plastic cable ties can be used, provided that the material thereof is nonreactive with the chemical bath, and/or regenerant fluid used to regenerate the resin 10. For reasons that will be discussed, the bands 86, 88, 90, and 92 extend outwardly from the riser pipe 4. An important feature of the sieve sleeve is that its mesh size only be sufficiently fine to prevent the passage of ion exchange resin beads (for example, U.S. Standard Sieve Size No. 70).

Figure 8:
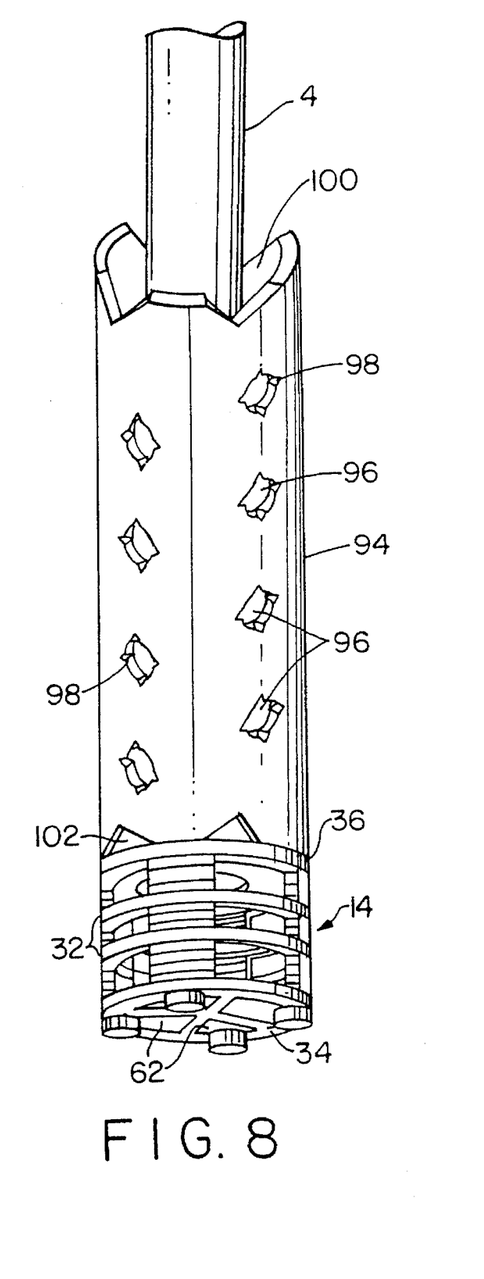
FIG. 8, shows the lower modified distributor screen and lower rigid cylinder.

The screening action at the lower end of the pipe 4 that was performed by the distributor screen 14 is now performed by structure that is similar to the sieve means at the top end of the riser pipe 4. In FIG. 8, a rigid cylinder 94 that is similar to the rigid cylinder 64 of FIG. 5 rests on the top disc 36 of the lower distributor screen 14. It has apertures 96 with inwardly extending triangular slots 98 around its outer edges, notches 100 at its upper end and notches 102 at its lower end. The slots 98 serve the same purpose as slots 65 of FIG. 5A, to prevent the sieve material at sieve bag 114 (see FIG. 10) from obstructing the associated aperture 96.

Figure 9:
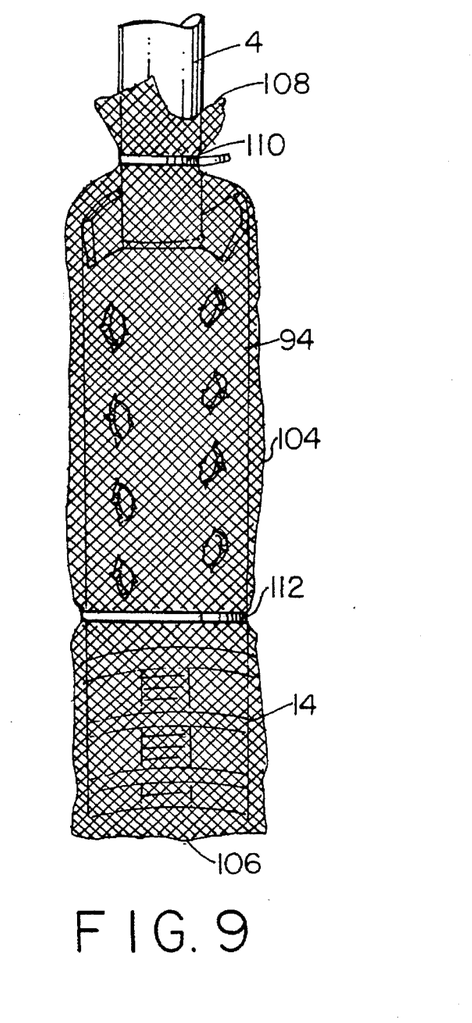
FIG. 9, shows a screen bag over a lower rigid cylinder and modified lower distributor screen.

FIG. 9 is the same as FIG. 8 except that a mesh bag 104 having a bottom 106 and an open end 108 is slipped over the sieve screen 14 and the rigid cylinder 94. A band 110 binds the open end 108 of the mesh bag 104 to the pipe 4, a band 112 binds the mesh bag 104 to the lower portion of the rigid cylinder 94 and a band 112 binds the lower end of the mesh bag 104 to the distributor screen 14.

Figure 10:
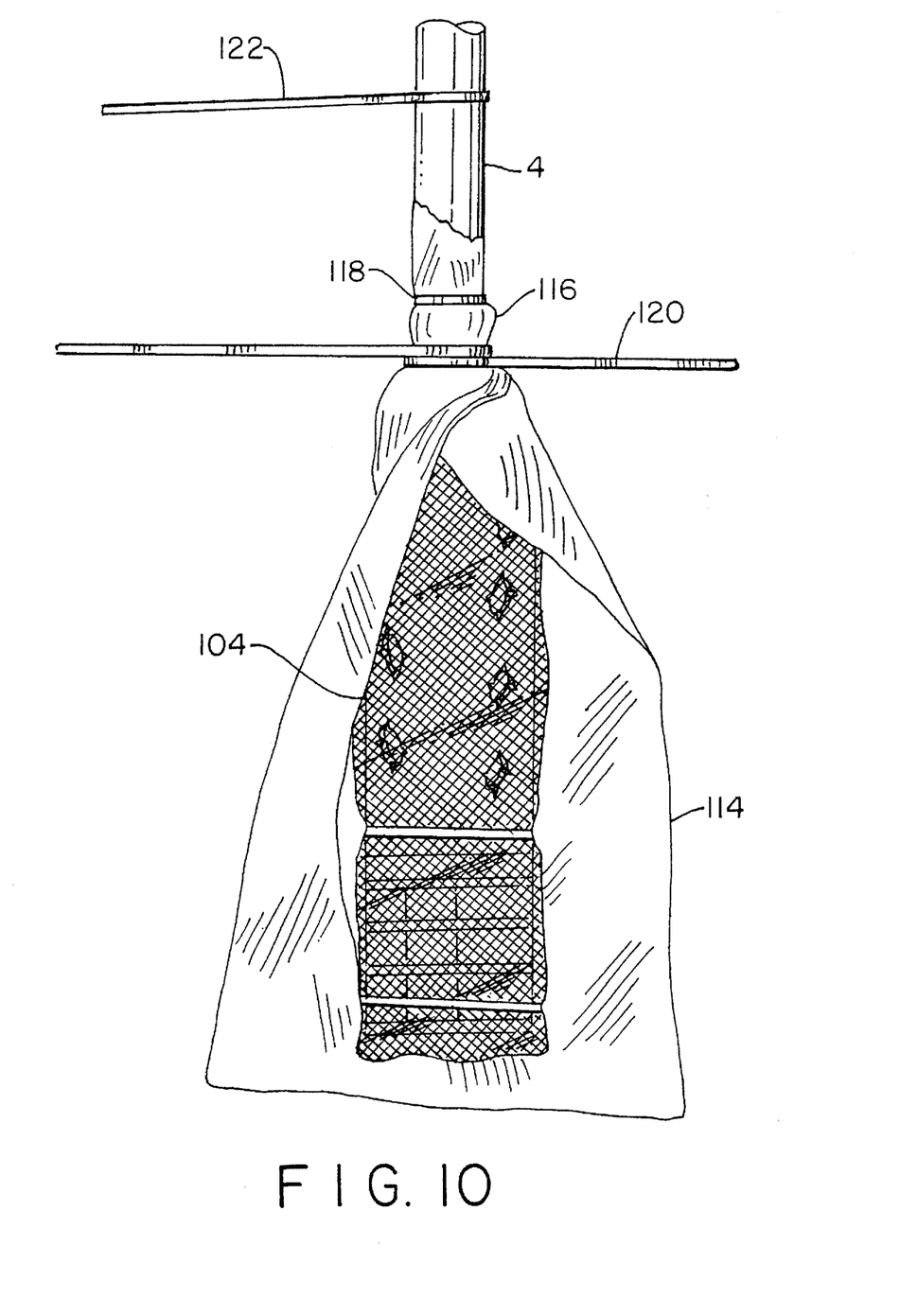
FIG. 10, shows a sieve screen over a mesh bag that is in turn over the lower rigid cylinder and modified lower distributor screen.

FIG. 10 is the same as FIG. 9 except that a sieve bag 114 has been placed around the mesh bag 104, but the latter can be seen through the sieve bag. The open end 116 of the sieve bag 114 is bound by bands 118 and 120 to the pipe 4. The ends of the band 120 extend outwardly from the riser pipe 4. A band 122 that has one end secured to the riser pipe 4 also extends outwardly therefrom. Again, an important feature of this sieve bag is that its mesh size is only sufficiently fine to prevent the passage of ion exchange resin beads (for example, U.S. Standard Sieve Size No. 70).

Figure 11:
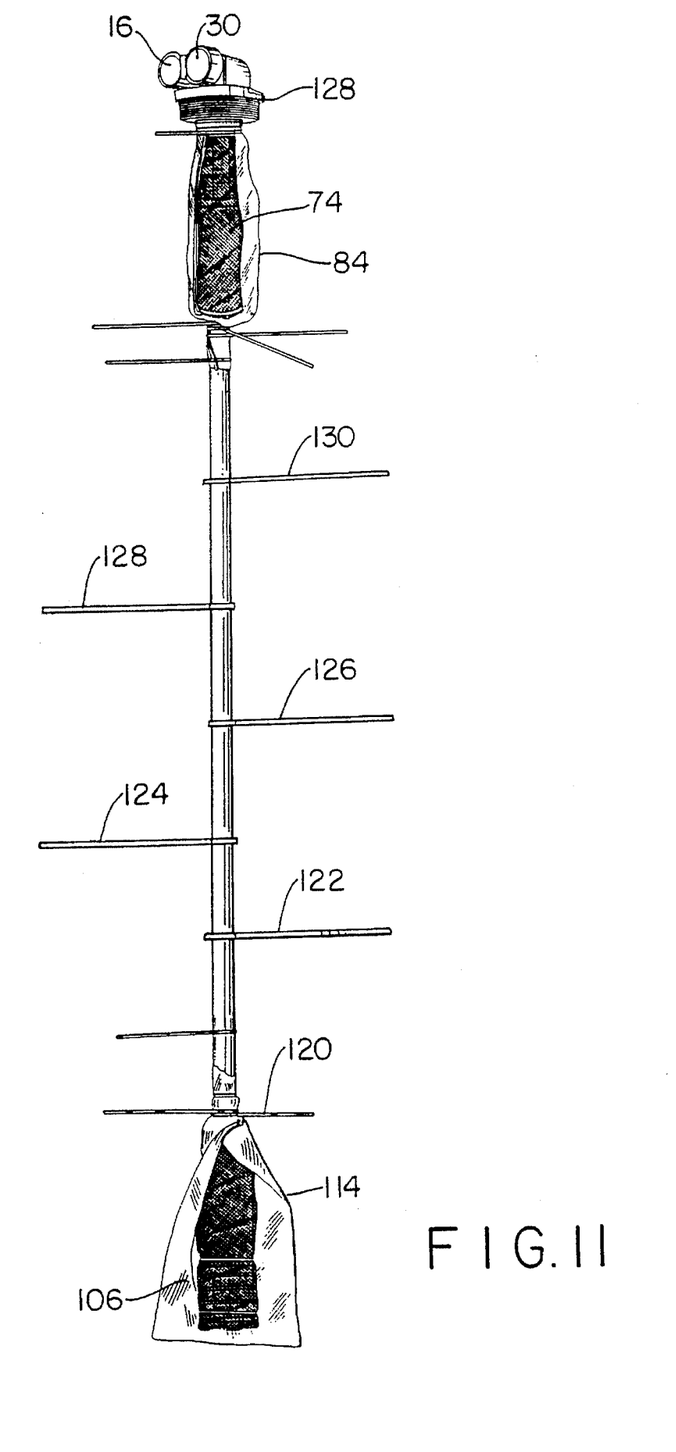
FIG. 11, is an outer view of the complete screening assembly of their invention showing the radial projections.

FIG. 11 shows the entire screening assembly that is to be inserted into a ion exchange vessel 2 except for what is inside the mesh sleeve 74 and the mesh bag 104 and additional outwardly extending bands 124, 126, 128, and 130.

Figure 12:
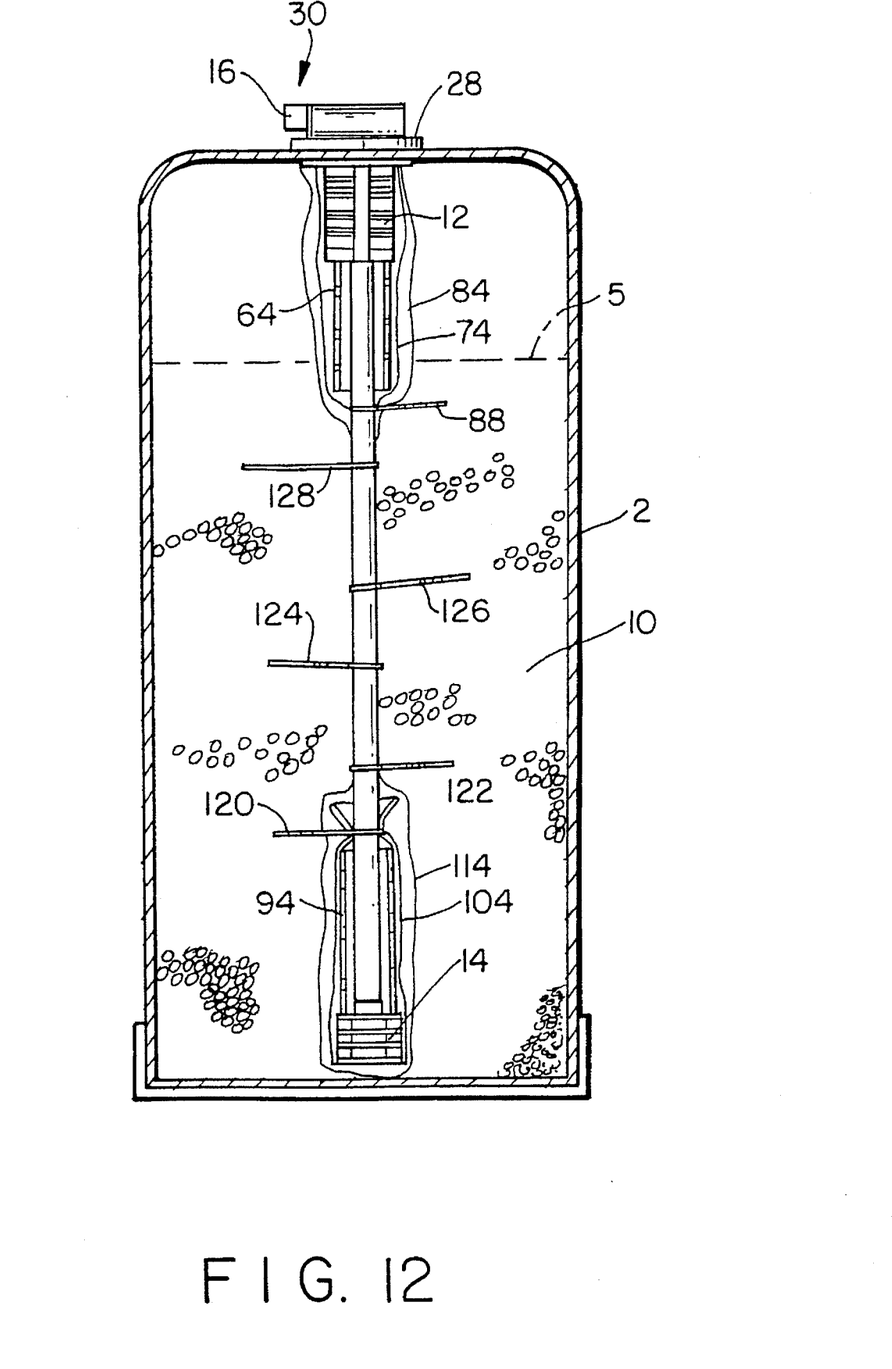
FIG. 12, shows an ion exchange column using the screening means of this invention with modified screens.

FIG. 12 is a cross section of an ion exchange column with the assembly of FIG. 11 mounted therein for use. The top portion includes the modified distributor screen 12, the rigid cylinder 64, the mesh sleeve 74, and the sieve sleeve 84. The bottom portion includes the modified distributor screen 14, the rigid cylinder 94, the mesh bag 104 and the sieve bag 114. Also shown are various bands or protrusions 88, 120, 122, 124, 126, and 128 that extend outwardly from the riser pipe 4 into the resin 10. The bands or protrusions prevent the resin 10 from rising as a solid cake during backflow operation and blinding or blocking the upper screening mechanism 64, 74, and 84. Preferably, the bands are constructed so as to resist bending in a vertical direction but to be flexible in an horizontal direction as previously noted. The bands, as previously described, cause fissures in the rigid cake of resin beads 10 that facilitate fluidization of the resin beads 10, thereby preventing lifting of resin bead bed as a single unit. The port 30 is not visible in this view but is indicated as being behind the port 16.

The advantageous operation of the invention is as follows. During reconditioning, paint solution flows into the port 16. Part of the solution passes through the distributor screen 12, the mesh sleeve 74 and the sieve sleeve 84 into the top of the vessel 2, and part of the solution also flows through a flow path including the rigid cylinder 64, and portions of the mesh sleeve 74 and sieve sleeve 84. After flowing down through the resin 10, part of the solution flows through the sieve bag 114, the mesh bag 104 and the modified distributor screen 14 to the riser pipe 4, and another part also flows through the rigid cylinder 94 to the riser pipe 4 and the port 30. Since the sieve sleeve 84 is flexible rather than rigid, as is the unmodified distributor screen 12, any aggregated resin beads-latex-pigment become dislodged from the screen surface as the screen flexes.

When the sieve sleeve 84 needs cleaning, rapid reversals of flow of water are caused to flow through the system that cause the flexible sieve material to expand and contract. This action dislodges deposits from the outside of the sieve sleeve 84 so that they may then be removed by redispersion into the rinsing media.

Although various embodiments of the present inventions are shown and described hereon, they are not meant to be limiting. Those of ordinary skill in the art may recognize certain modifications to these embodiments, which modifications are meant to be covered by the spirit and scope of the appended claims. For example, the material for the sieve sleeve 84 of FIG. 7, and the sieve bag 114 of FIG. 10 can be made with heavy material to be semiflexible, whereby each is sufficiently stiff to retain their intended shapes without using other means, and to yet be flexible enough to expand and contract during rapid reversals of water flow to provide a self cleaning feature.

What is claimed is:

1. Apparatus for use in an ion exchange unit comprising:

a riser pipe;

a port assembly connected to a top portion of said riser pipe, said port assembly including both an outlet port having a fluid passageway opening into an opening of the top portion of said riser pipe, and an inlet port having a fluid passageway opening proximate to the outside diameter of said riser pipe where it connects to said port assembly;

a hollow cylindrical rigid first distributor screen including an upper open end rigidly secured to a bottom portion of said port assembly, said first distributor screen also being concentric with an upper portion of said riser pipe, the fluid passageway of said inlet port opening into an interior portion of said first distributor screen, the latter also including a lower end, and a plurality of successive openings along side portions thereof for the passage of fluid;

a rigid cylinder slideably mounted upon and coaxial with said riser pipe, said rigid cylinder having an upper end located below the lower end of said first distributor screen;

means defining apertures extending through said rigid cylinder;

a mesh cylinder coaxial with and outside of said first distributor screen and said rigid cylinder;

means for securing one end of said mesh cylinder to the upper end of said first distributor screen below said port assembly;

means for securing the other end of said mesh cylinder to said riser pipe at a point adjacent a lower end of said rigid cylinder for locating the upper end of said rigid cylinder proximate to the lower end of said first distributor screen, while permitting axial movement of said rigid cylinder with longitudinal flexure of said mesh;

a flexible sieve sleeve surrounding said mesh cylinder, said sieve sleeve having substantially smaller pores than said mesh for passage of fluid;

means for securing one end of said sieve sleeve to said riser pipe at a point adjacent said lower end of said rigid cylinder;

means for securing the other end of said sieve sleeve to the upper end of said first distributor screen below said port assembly; and means for conducting fluid from said first distributor screen into said rigid cylinder.

2. Apparatus as set forth in claim 1, wherein slots are formed in the outer edges of said apertures in said rigid cylinder.

3. Apparatus as set forth in claim 1 further comprising:

a hollow cylindrical rigid second distributor screen including an upper open end rigidly secured to a bottom portion of said riser pipe, with a bottom end of said riser pipe opening into an interior portion of said second distributor screen, the latter including a plurality of openings through side and bottom portions for the passage of fluid;

a second rigid cylinder coaxial with and slideably mounted upon a lower portion of said riser pipe above said second distributor screen, said second rigid cylinder having a lower end adjacent the upper end of said second distributor screen;

a flexible mesh bag covering said second rigid cylinder;

means securing one end of said flexible mesh bag to said riser pipe above said second rigid cylinder, and the other end of said flexible mesh bag to a portion of the other end of said second distributor screen;

a flexible sieve bag enclosing said second mesh sleeve, said bag having a closed end adjacent the bottom end of the riser pipe and an open end; and means for securing the open end of said bag to said riser pipe at a position above an upper end of said second rigid cylinder, the latter also including a plurality of apertures for the passage of fluid.

4. Apparatus as set forth in claim 3 further comprising:

a protrusion attached to said riser pipe at a point between said sieve sleeve and said sieve bag said protrusion extending outwardly from said pipe.

5. Apparatus as set forth in claim 3 further comprising:

a plurality of protrusions attached to said riser pipe at points between said sieve sleeve and said sieve bag, said protrusions extending outwardly from said riser pipe.

6. Apparatus as set forth in claim 3, wherein slots are formed in the outer edges of said apertures in said second rigid cylinder.

7. Apparatus as set forth in claim 3, further comprising notches in the ends of said rigid cylinders.

8. Apparatus as set forth in claim 3, wherein said sieve sleeve and said sieve bag each include means for self cleaning themselves comprising material both sufficiently stiff to retain the intended shapes of said sieve sleeve and said sieve bag, and sufficiently flexible to expand and contract during rapid reversals of fluid flow through each to dislodge deposits from the outside thereof.

9. Apparatus as set forth in claim 3, wherein the material of each of said sieve sleeve and sieve bag comprises means for preventing the passage therethrough of ion exchange beads contained within said ion exchange unit, said passage preventing means consisting of apertures in the respective material that are too small for the ion exchange beads to pass through.

* * * * *